(12) United States Patent
Kondapi et al.

(10) Patent No.: US 11,470,123 B2
(45) Date of Patent: Oct. 11, 2022

(54) ROUTING REQUESTS IN A DISTRIBUTED SYSTEM

(71) Applicant: Dell Products L.P., Round Rock, TX (US)

(72) Inventors: Srikanth Kondapi, Austin, TX (US); Alexander Kucheravy, Austin, TX (US); Danilo O. Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/060,790

(22) Filed: Oct. 1, 2020

(65) Prior Publication Data

US 2022/0109625 A1   Apr. 7, 2022

(51) Int. Cl.
| | |
|---|---|
| *H04L 9/40* | (2022.01) |
| *H04L 45/42* | (2022.01) |
| *H04L 45/302* | (2022.01) |
| *G06F 9/52* | (2006.01) |
| *G06F 21/53* | (2013.01) |
| *H04L 67/10* | (2022.01) |

(52) U.S. Cl.
CPC ............... *H04L 63/20* (2013.01); *G06F 9/52* (2013.01); *G06F 21/53* (2013.01); *H04L 45/306* (2013.01); *H04L 45/42* (2013.01); *H04L 63/0281* (2013.01); *H04L 67/10* (2013.01)

(58) Field of Classification Search
CPC .. G06F 9/4806; G06F 9/5027; G06F 9/44526; G06F 21/604; G06F 16/285; G06F 16/245; G06F 21/566; G06F 21/53; G06F 21/577; G06F 21/554; G06F 21/606; G06F 21/552; G06F 9/52; G06F 9/542; G06F 8/36; G06F 9/45558; G06F 9/44505; G06Q 10/06311; G06Q 30/0248; H04L 63/045; H04L 63/0464; H04L 63/1416; H04L 63/1408; H04L 63/1425; H04L 63/20; H04L 67/10; H04L 67/38; H04L 49/70; H04L 41/0843; H04L 41/5048; H04L 41/0869
See application file for complete search history.

(56) References Cited

U.S. PATENT DOCUMENTS

| | | | | |
|---|---|---|---|---|
| 10,621,613 | B2* | 4/2020 | Shiravi Khozani | G06F 21/53 |
| 2019/0207967 | A1* | 7/2019 | Vashisht | H04L 63/20 |
| 2019/0327144 | A1* | 10/2019 | Tembey | H04L 67/10 |
| 2019/0384632 | A1* | 12/2019 | Parikh | G06Q 10/06311 |
| 2021/0406039 | A1* | 12/2021 | Theimer | G06F 9/52 |

* cited by examiner

*Primary Examiner* — Kyung H Shin
(74) *Attorney, Agent, or Firm* — Kirton McConkie; Brian Tucker

(57) ABSTRACT

Requests can be routed in a distributed system. When a distributed system includes a core service in which a plurality of plugins run and includes a plurality of clients that run external to the core service, the core service can provide a command router that functions as a common mechanism for routing requests to the plugins. The command router can provide an external endpoint by which the external clients can submit requests to access functionality of the plugins. The command router can also provide an internal endpoint by which the plugins can submit requests to access other plugins. Employing a command router within the core service can facilitate adding and removing plugins.

20 Claims, 11 Drawing Sheets

ROUTING REQUESTS IN A DISTRIBUTED SYSTEM

CROSS-REFERENCE TO RELATED APPLICATIONS

N/A

BACKGROUND

The present invention relates generally to distributed systems in which an application may consist of multiple functionally complete modules that are isolated from one another. In such distributed systems, it may not be known prior to starting the system which of the modules the application may include. In such cases, it may not be possible to provide reliable and secure communication between the application's modules and external clients or even between the modules themselves.

BRIEF SUMMARY

The present invention extends to methods, systems, and computer program products for routing requests in a distributed system. When a distributed system includes a core service in which a plurality of plugins run and includes a plurality of clients that run external to the core service, the core service can provide a command router that functions as a common mechanism for routing requests to the plugins. The command router can provide an external endpoint by which the external clients can submit requests to access functionality of the plugins. The command router can also provide an internal endpoint by which the plugins can submit requests to access other plugins. Employing a command router within the core service can facilitate adding and removing plugins.

In some embodiments, the present invention may be implemented as a method for routing requests in a distributed system that includes a core service, a plurality of plugins that run in the core service and a plurality of clients that are external to the core service. A command router of the core service can provide an external endpoint by which the plurality of clients may submit requests to the plurality of plugins. The command router can receive, via the external endpoint, a first request from a first client of the plurality of clients. The command router can determine that the first request targets a first plugin of the plurality of plugins. In response to determining that the first request targets the first plugin, the command router can invoke a method implemented by the first plugin.

In some embodiments, the present invention may be implemented as computer storage media storing computer executable instructions which when executed on a computing device implement a command router of a core service in which a plurality of plugins run. The command router can be configured to perform a method for routing requests to the plurality of plugins. The command router can receive, via an external endpoint and from clients that are external to the core service, requests to access the plugins. The command router can also receive, via an internal endpoint and from at least one of the plugins, requests to access the plugins. The command router can route the requests received via the external endpoint and the requests received via the internal endpoint to the plurality of plugins.

In some embodiments, the present invention may be implemented as a computing device that includes one or more processors and computer storage media storing computer executable instructions which when executed by the one or more processors implement a core service having a command router, a plurality of plugins that run in the core service and a plurality of clients that are external to the core service. The command router is configured to provide an external endpoint by which the plurality of clients submit requests to access the plurality of plugins and an internal endpoint by which the plurality of plugins submit requests to access others of the plurality of plugins.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
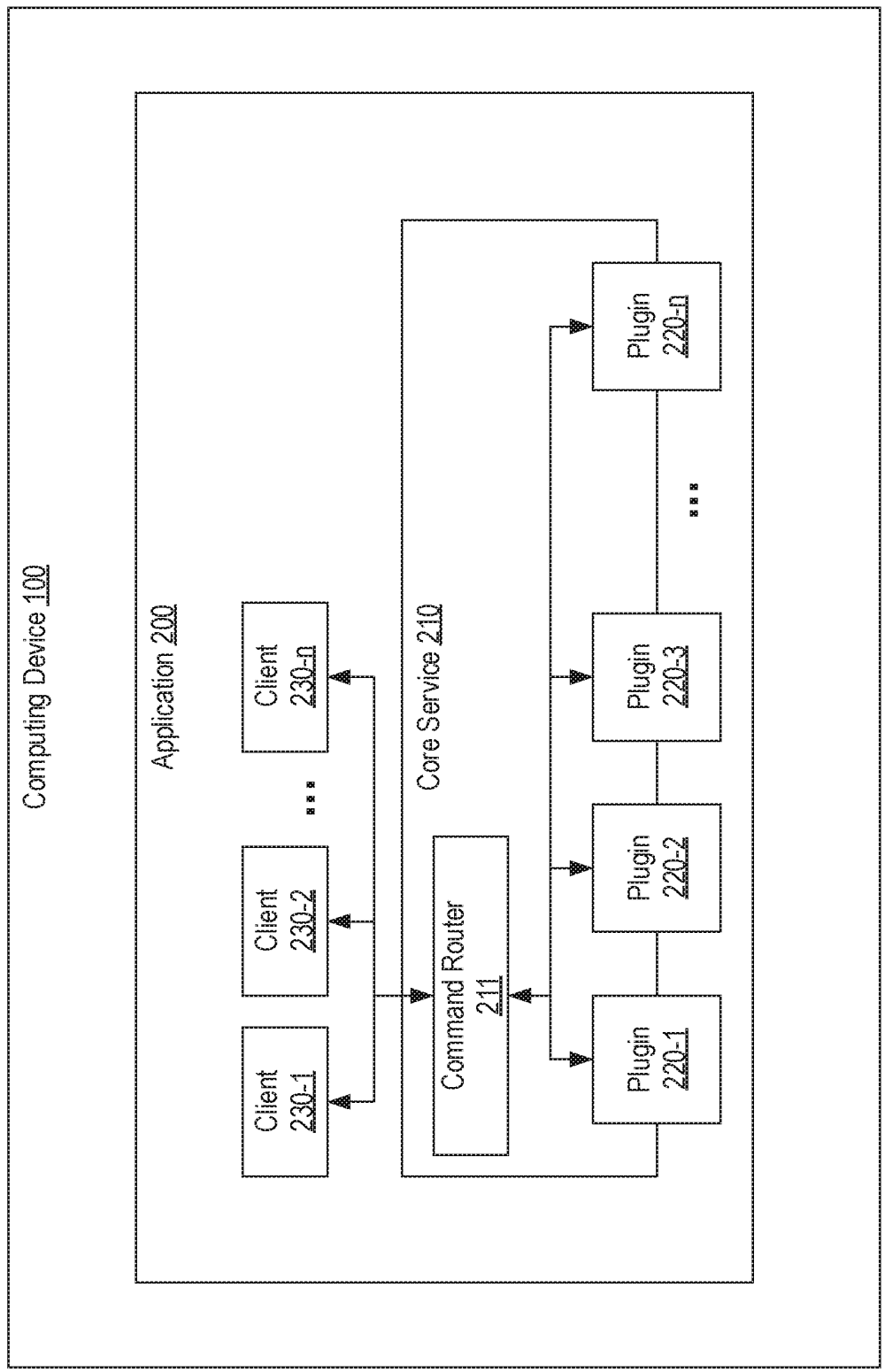
FIG. 1 illustrates an example computing environment in which embodiments of the present invention may be implemented.

FIG. 1 illustrates an example computing environment in which embodiments of the present invention may be implemented. As shown, an application 200 may be executed on a computing device 100. Computing device 100 may typically represent a desktop, laptop, tablet, virtual machine, etc. that runs an operating system such as Windows, Linux or macOS. Application 200 can include a core service 210 that may integrate a number of modules, such as plugins 220-1 through 220-*n* (or collectively "plugins 220"), that provide some type of functionality within application 200. As mentioned in the background, the number/type of plugins 220 that application 200 may include when run on any particular computing device 100 may vary and may therefore not be known prior to launching a distributed system that includes/employs application 200.

Application 200 is also shown as including a number of clients 230-1 through 230-n (or collectively "clients 230"). Clients 230 can represent any component of application 200 that is external to core service 210 and that interfaces with any of plugins 220. Given that it may not be known before runtime which plugins 220 may be available to clients 230, it may be difficult to configure clients 230 to interface with plugins 220. To address this and possibly other difficulties, core service 210 can provide a command router 211 that functions as an intermediary between clients 230 and plugins 220.

Figure 1A:
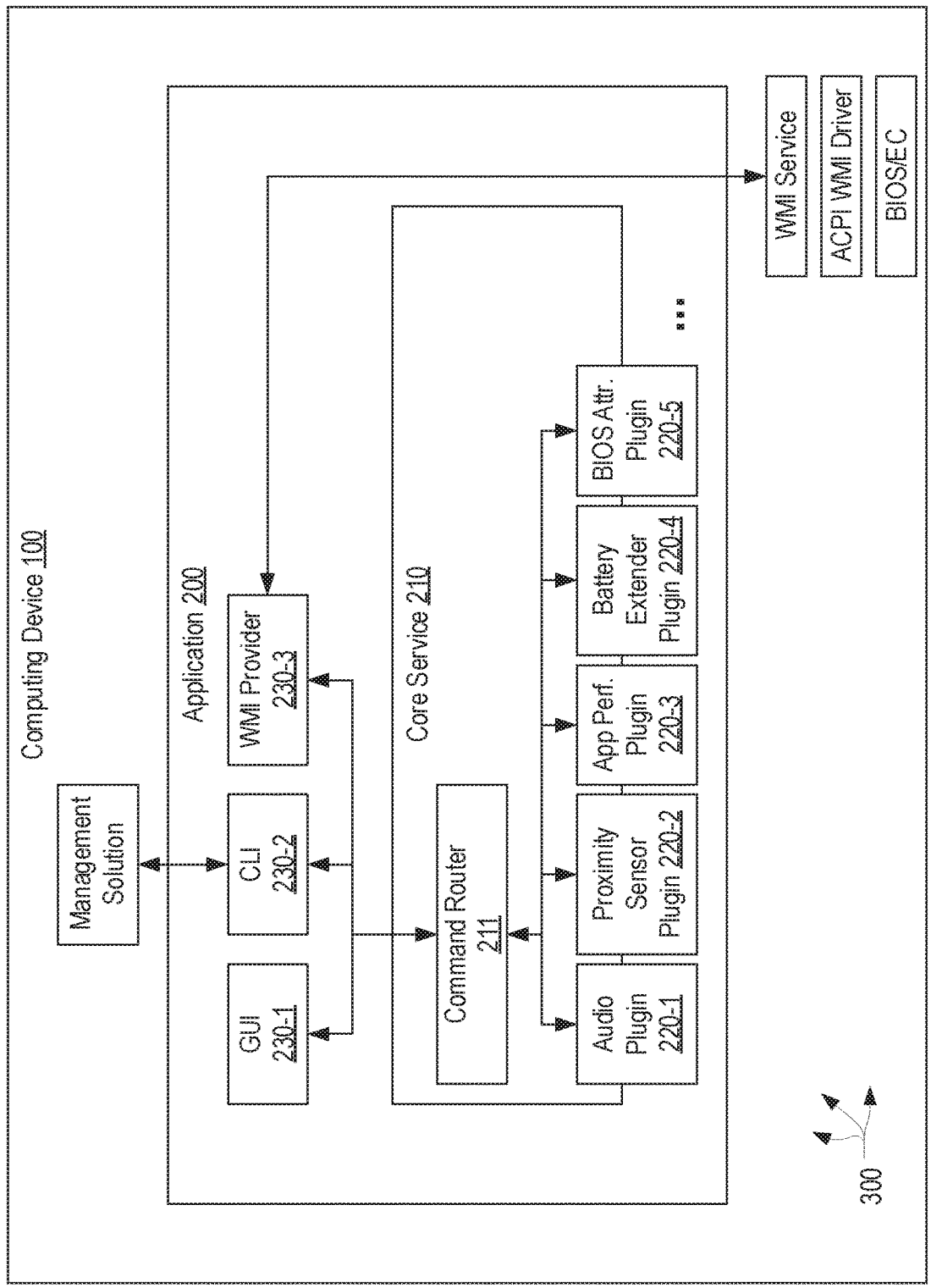
FIG. 1A illustrates another example computing environment in which embodiments of the present invention may be implemented.

FIG. 1A provides one specific example for application 200. FIG. 1A should not be viewed as limiting the present invention to any particular embodiment but is intended only to provide context for the following description of more generalized embodiments. In FIG. 1A, application 200 is part of an optimizer solution that can be deployed on computing device 100 to enhance its performance for a number of use cases and/or scenarios. For example, application 200 could represent the Dell Optimizer application.

Accordingly, core service 210 is shown as including a number of plugins 220 including an audio plugin 220-1, a proximity sensor plugin 220-2, an application performance plugin 220-3, a battery extender plugin 220-4 and a BIOS attribute plugin 220-5. Although not shown, when application 200 is in the form of an optimizer solution, it may also include a dynamic charge plugin, a battery plugin, a power management plugin, a telemetry plugin, a settings plugin, a Toast notification plugin, a discrete graphics plugin, a memory performance plugin and possibly many other types of plugins. Of course, when application 200 is a different type of application, it may include an entirely different set of plugins or other type of modules.

Application 200 is also shown as including three different clients 230 including a graphical user interface (GUI) 230-1, the common language infrastructure (CLI) 230-2 and a Windows Management Instrumentation (WMI) provider 230-3, each of which may be configured to interface with one or more of plugins 220. For example, GUI 230-1 may enable a user to interface directly with application 200, CLI 230-2 may enable a management solution (e.g., System Center Configuration Manager (SCCM)) to interface with application 200, and WMI provider 230-3 may enable application 200 to leverage WMI (e.g., to interface with the WMI service).

Figure 2:
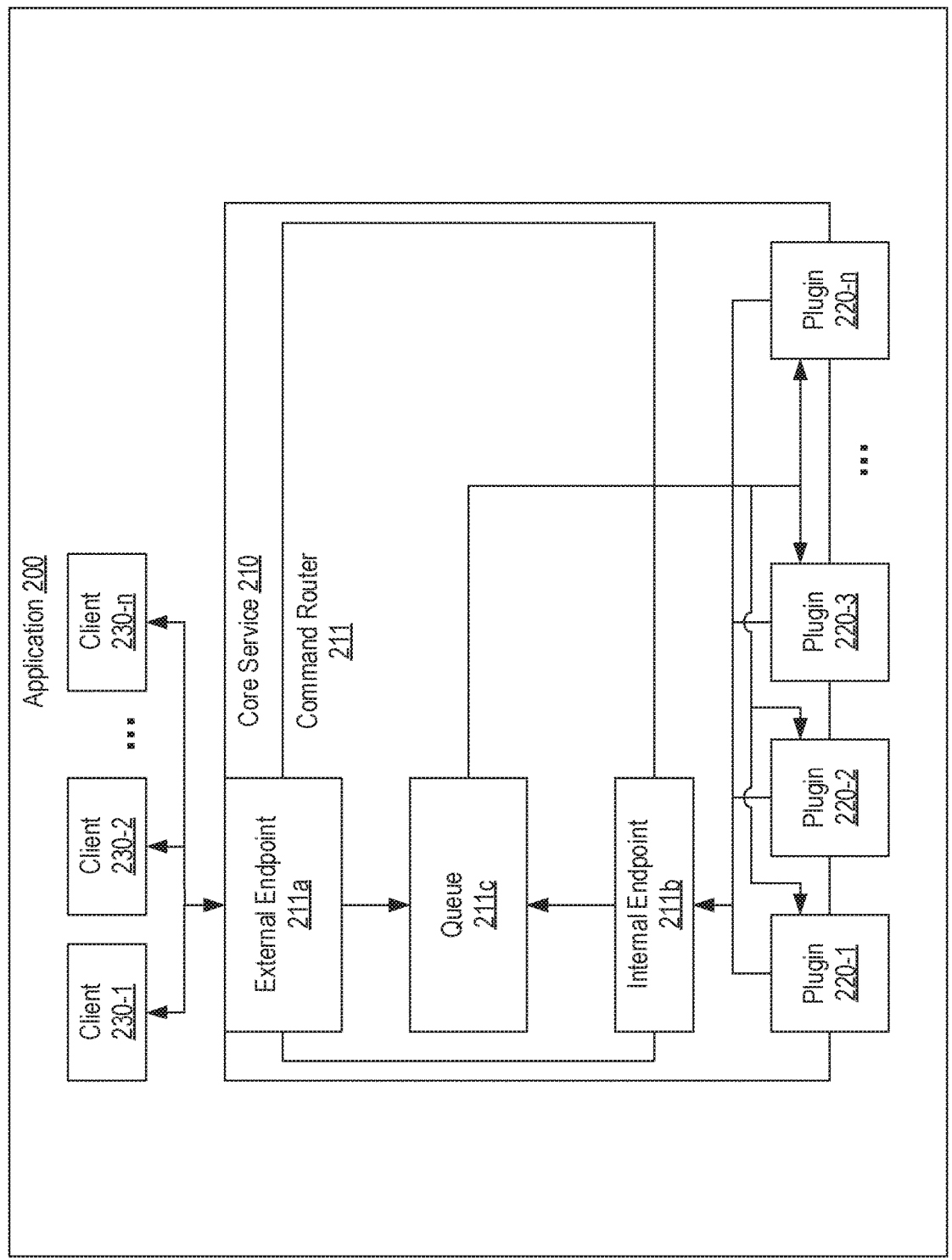
FIG. 2 provides an example of a command router that may be employed within a core service in accordance with embodiments of the present invention.

FIG. 2 provides an example of how command router 211 may be configured in accordance with some embodiments of the present invention. As shown, command router 211 may provide an external endpoint 211a by which each client 230 interfaces with core service 210, and particularly, with any plugin 220 that is integrated into core service 210. In some embodiments, external endpoint 211a may be a Windows Communication Foundation (WDF) endpoint. Command router 211 may also provide an internal endpoint 211b by which each plugin 220 can communicate with any other plugin 220. Command router 211 may also include a queue 211c for maintaining requests received via external endpoint 211a and internal endpoint 211b.

Figure 3:
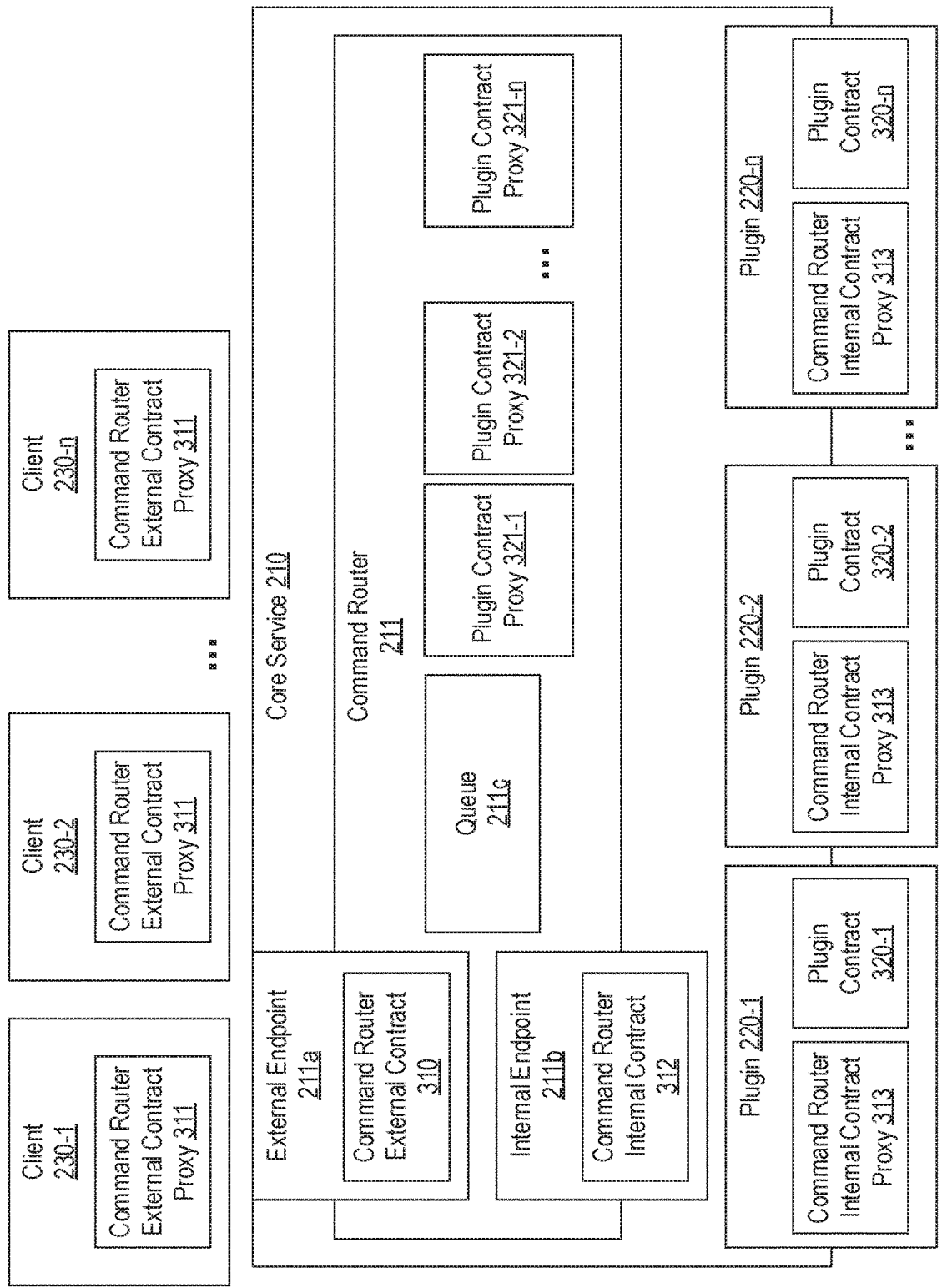
FIG. 3 provides another example of a command router that may be employed within a core service in accordance with embodiments of the present invention.

FIG. 3 provides a more detailed example of how core service 210 may be configured. As shown, each of plugins 220-1 through 220-n can implement a plugin contract 320-1 through 320-n respectively (or collectively "plugin contracts 320"). Each plugin contract 320 can be viewed as an interface that the respective plugin 220 provides to enable other components to invoke an operation that the plugin provides. For example, each plugin contract 320 can be a WCF "service contract." Notably, absent the techniques of the present invention, clients 230 would need to interface directly with the plugin contract 320 of any plugin 220 with which it desires to communicate. However, in accordance with embodiments of the present invention, command router 211 can provide a common mechanism by which any of clients 230 can interface with plugin contracts 320 as described in detail below.

FIG. 3 also shows that external endpoint 211a includes a command router external contract 310. Command router external contract 310 can be viewed as an interface that command router 211 provides to enable clients 230 to interface with command router 211 via external endpoint 211a. For example, command router external contract 310 can be a WCF service contract. To communicate with command router 211 via external endpoint 211a, each client 230 can generate a command router external contract proxy 311 (e.g., a WCF proxy class and configuration file).

Command router external contract proxy 311 enables clients 230 to invoke any method that command router external contract 310 defines. In accordance with embodiments of the present invention, command router external contract 310 can provide one or more methods by which clients 230 can identify plugin contracts 320 and by which clients 230 can specify which methods of plugin contracts 320 command router 211 should invoke. In other words, command router external contract 310 provides a uniform mechanism by which any client 230 can indirectly interface with any plugin 220.

FIG. 3 further shows that internal endpoint 211b includes a command router internal contract 312. Command router internal contract 312 can be viewed as an interface that command router 211 provides to enable plugins 220 to interface with command router 211 via internal endpoint 211b. For example, command router internal contract 312 can be a WCF service contract. To communicate with command router 211 via internal endpoint 211b, each plugin 220 can generate a command router internal contract proxy 313 (e.g., a WCF proxy class and configuration file). Although not shown, core service 210 may also generate a command router internal contract proxy 313 for communicating with command router 211 via internal endpoint 211b.

Because clients 230 are external to core service 210, their communications with command router 211 via external endpoint 211a can typically be serialized by command router external contract proxy 311 (e.g., in the form of an HTTP request) and then deserialized by command router 211 to identify and invoke the appropriate method of the appropriate plugin contract 320. In contrast, because plugins 220 run within core service 210, their communications with command router 211 via internal endpoint 211b can directly provide the parameters that command router 211 can use in invoking the appropriate method of the appropriate plugin 320.

FIG. 3 further shows that command router 211 can generate plugin contract proxies 321-1 through 321-n (or collectively "plugin contract proxies 321") by which command router 211 may invoke any method of plugin contracts 320-1 through 320-n. Command router 211 may employ plugin contract proxies 321 to invoke these methods of plugin contracts 320 in response to requests received via external endpoint 211a (i.e., requests received from clients 230) and from internal endpoint 211b (i.e., from other plugins 220). Queue 211c can be employed to enable command router 211 to manage requests received via external endpoint 211a and internal endpoint 211b.

Figure 4A:
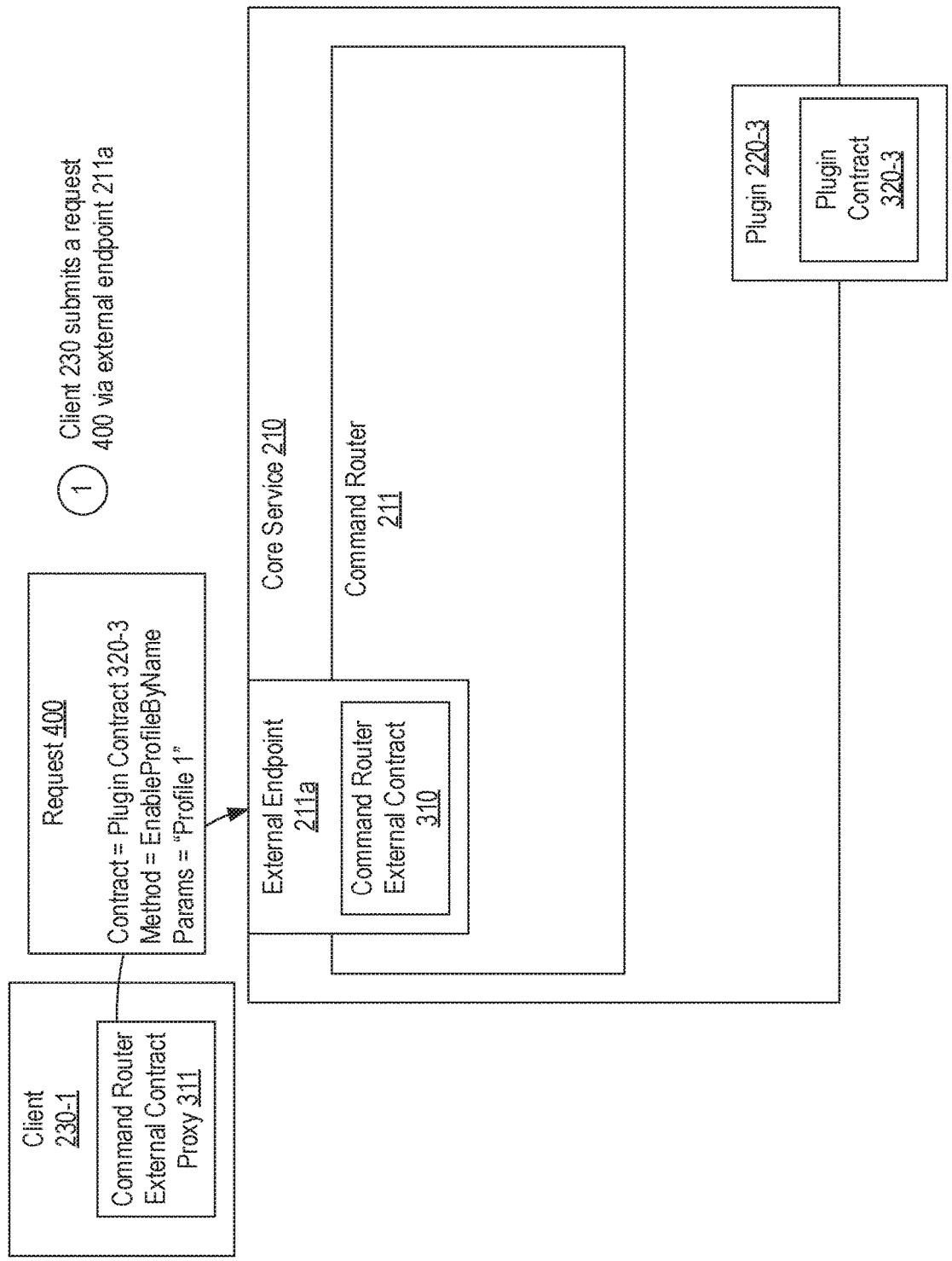
FIGS. 4A and 4B provide an example of how the command router may handle a request that it receives via an external endpoint.
Figure 4B:
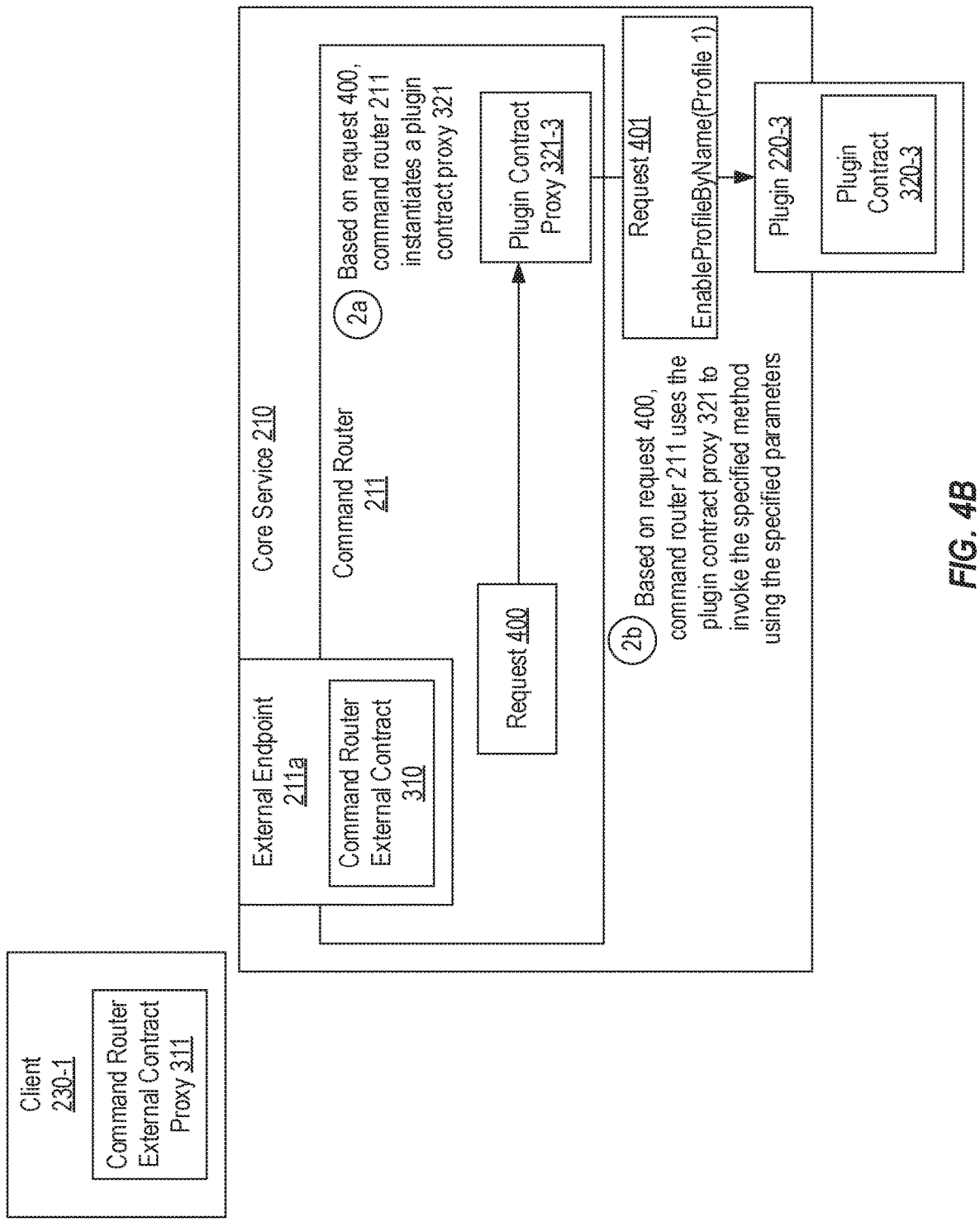

FIGS. 4A and 4B provide an example of how a client 230 can interface with command router 211 to cause a method of a plugin contract 320 to be invoked. In this example, it will be assumed that plugin 220-3 is an application performance plugin and that client 230-1 is attempting to request that application performance plugin 220-3 enables a particular profile. Accordingly, in step 1 shown in FIG. 4A, client 230-1 can employ command router external contract proxy 311 to send a request 400 to command router 211 via external endpoint 211a. For example, command router external contract 310 may provide a method that clients 230 can invoke to specify a plugin contract, a method to be invoked and any parameters of the specified method. In this example, it is assumed that request 400 specifies a contract of "plugin contract 320-3" (i.e., the contract that plugin 320-3 provides), a method of "EnableProfileByName" (which is assumed to be a method of plugin contract 320-3) and a parameter of "Profile 1." This is merely a generalized example of the type of content that a request to external endpoint 211a may contain. For example, request 400 could conform to any binding or channel that the WCF provides or enables including custom channels. Of primary importance is that client 230-1 can submit request 400 to command router 211 via external endpoint 211a as opposed to interfacing directly with plugin 220-3.

Turning to FIG. 4B, in response to receiving request 400, command router 211 can parse the content of the request to determine to which plugin contract 320 pertains. In step 2a, command router 211 can instantiate a plugin contract proxy 321-3 for the contract specified in request 400. Then, in step 2b, command router 211 can use plugin contract proxy 321-3 to invoke the method specified in request 400 using any parameters specified in request 400. In this example, command router 211 can employ plugin contract proxy 321-3 to invoke the EnableProfileByName method with the string "Profile 1" as input. In response, a request 401 can be sent to plugin 320-3 to indicate that the method has been invoked. Plugin 220-3, which implements the EnableProfileByName method, will then process the invocation and provide any return values that can be routed back to client 230-1 in a similar manner.

Because core service 210 can run in the Common Language Runtime (CLR), steps 2a and 2b can entail just-in-time compiling of plugin contract proxy 321-3. In some embodiments of the present invention, command router 211 can be configured to precompile expressions associated with a method to be invoked for a first time so that, any subsequent time the method is to be invoked, the precompiled expressions may be used to invoke the method. This precompilation can enhance the performance of application 200. For example, even though clients 230 may invoke a method via command router 211, the precompilation of the expressions may cause the performance to be similar to scenarios where the method is directly invoked.

Each of clients 230 can submit such requests to command router 211 via external endpoint 211a in the manner shown in FIG. 4A. In this way, each client's requests pass through the common external endpoint 211a and are processed by command router 211 thereby enabling command router to implement a variety of techniques for managing requests that target plugins 220. Although not shown, functionality similar to that shown in FIGS. 4A and 4B can be performed when any of plugins 220 submit requests to access another plugin 220. In particular, each plugin 220 can employ command router internal contract proxy 313 to submit requests to command router 211 via internal endpoint 211b, and command router 211 can process such requests to invoke the respective methods of the respective plugins 220. As mentioned above, however, command router internal contract 312 can provide a more direct technique for passing the method and parameters to command router 211 due to the fact that plugins 220 and command router 211 each run in core service 210.

Figure 5:
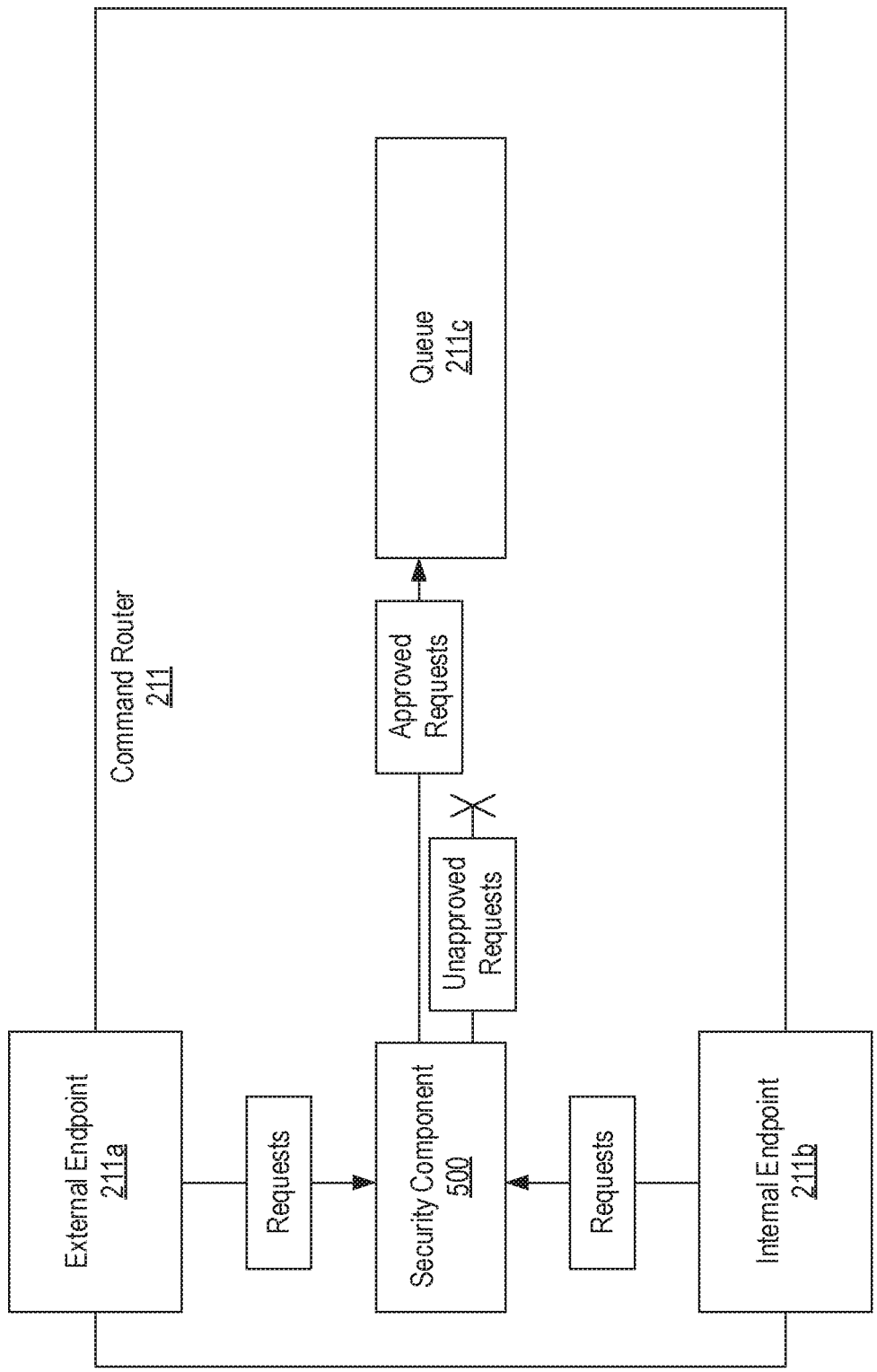
FIG. 5 provides an example of how the command router can provide security to the plugins.

FIG. 5 represents how command router 211 can be configured to provide security to all plugins 220. As shown, command router 211 can include a security component 500 that is configured to evaluate requests that are received view external endpoint 211a. In some embodiments, security component 500 may also be configured to evaluate requests that are received via internal endpoint 211b. Based on the evaluation of a request, security component 500 can either approve the request and place it in queue 211c or reject the request. In some embodiments, the evaluation may entail verifying that the source of the request is authorized to make the request (e.g., by validating user credentials, by confirming that the request was submitted by an authorized client 230, etc.). Notably, security component 500 can evaluate all requests received from clients 230 regardless of which plugin 220 they may target. Security component 500 therefore provides a common mechanism for securing any plugin 220 that may be integrated into core service 210.

Figure 6:
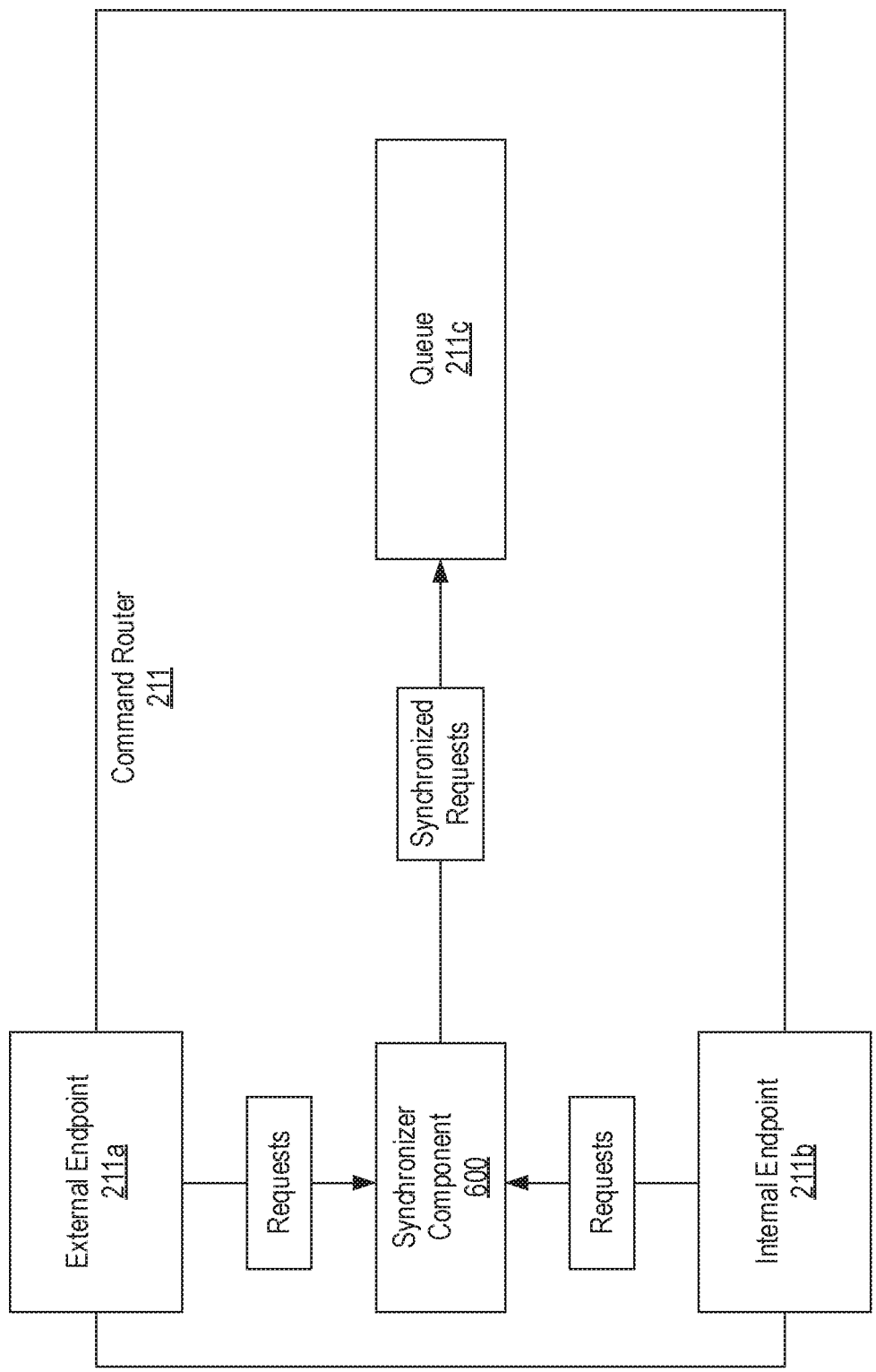
FIG. 6 provides an example of how the command router can synchronize requests.

FIG. 6 represents how command router 211 can be configured to synchronize requests. As shown, command router 211 may include a synchronizer component 600 that is configured to evaluate requests received via external endpoint 211a and internal endpoint 211b and in response perform any synchronization to the requests that may be appropriate. For example, in some cases, it may be necessary to submit a request to one plugin 220 before submitting a request to another plugin 220. In such cases, synchronizer component 600 may cause the requests to be stored in queue 211c in the proper order (or rearranged into the proper order within queue 211c). As another example, in some cases, synchronizer component 600 may detect the occurrence of circular requests and prevent them from continuing (e.g., when a client's request to a first plugin causes the first plugin to send a request to a second plugin which in turn causes the second plugin to send a request to the first plugin and so on). Because command router 211 handles all requests that target plugins 220, it can perform this type of synchronization of requests that target different plugins 220.

Figure 7:
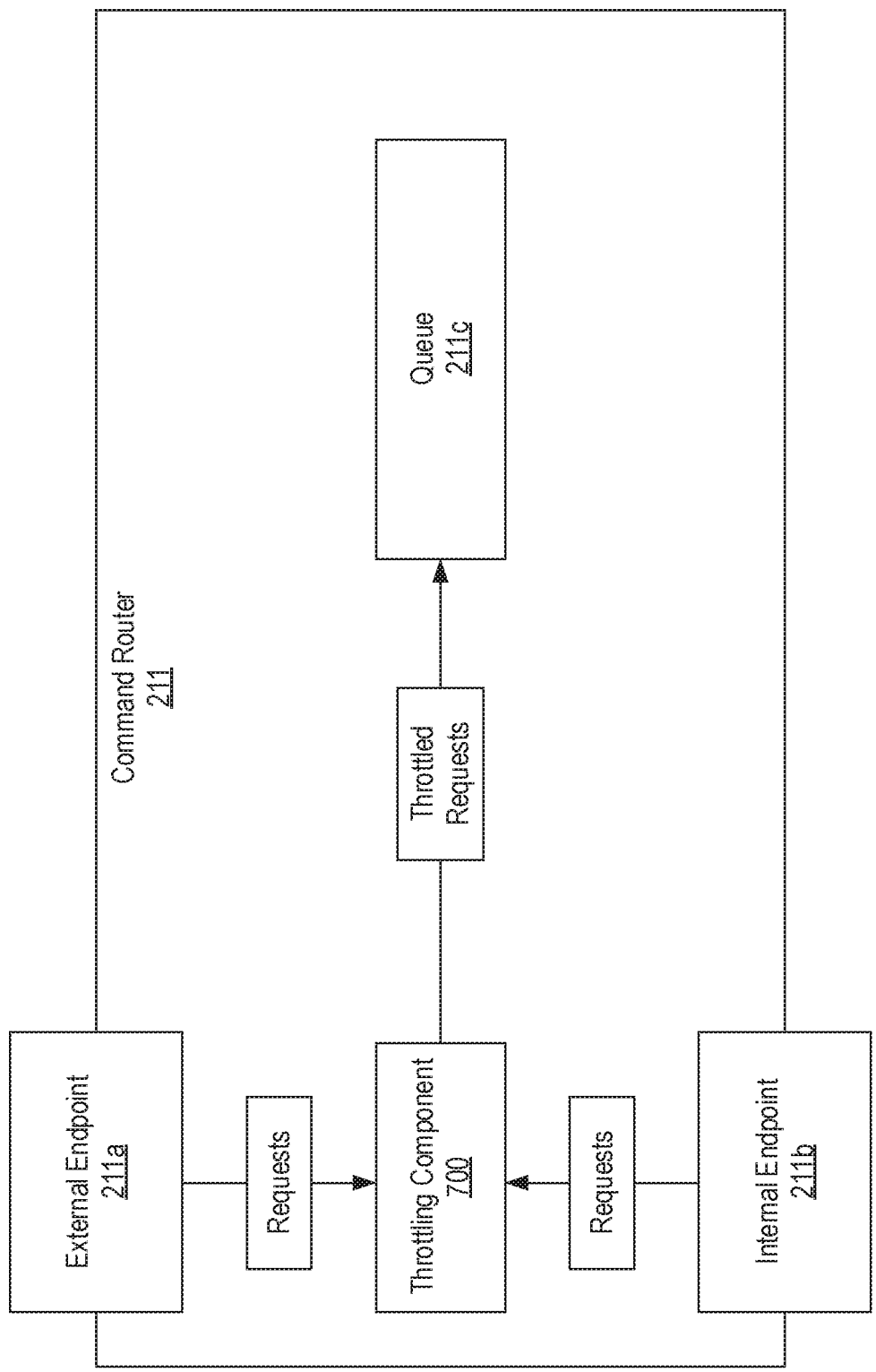
FIG. 7 provides an example of how the command router can throttle requests.

FIG. 7 represents how command router 211 can be configured to throttle requests. As shown, command router 211 may include a throttling component 700 that is configured to monitor the number and/or rate of requests that are received via external endpoint 211a and/or internal endpoint 211b or to otherwise monitor resource utilization and/or availability on computing device 100. Based on this monitoring, throttling component 700 can throttle the processing of the requests to prevent application 200 from excessively loading computing device 100. Because command router 211 handles all requests that target plugins 220, it can perform this type of throttling on all requests that target plugins 220.

Figure 8:
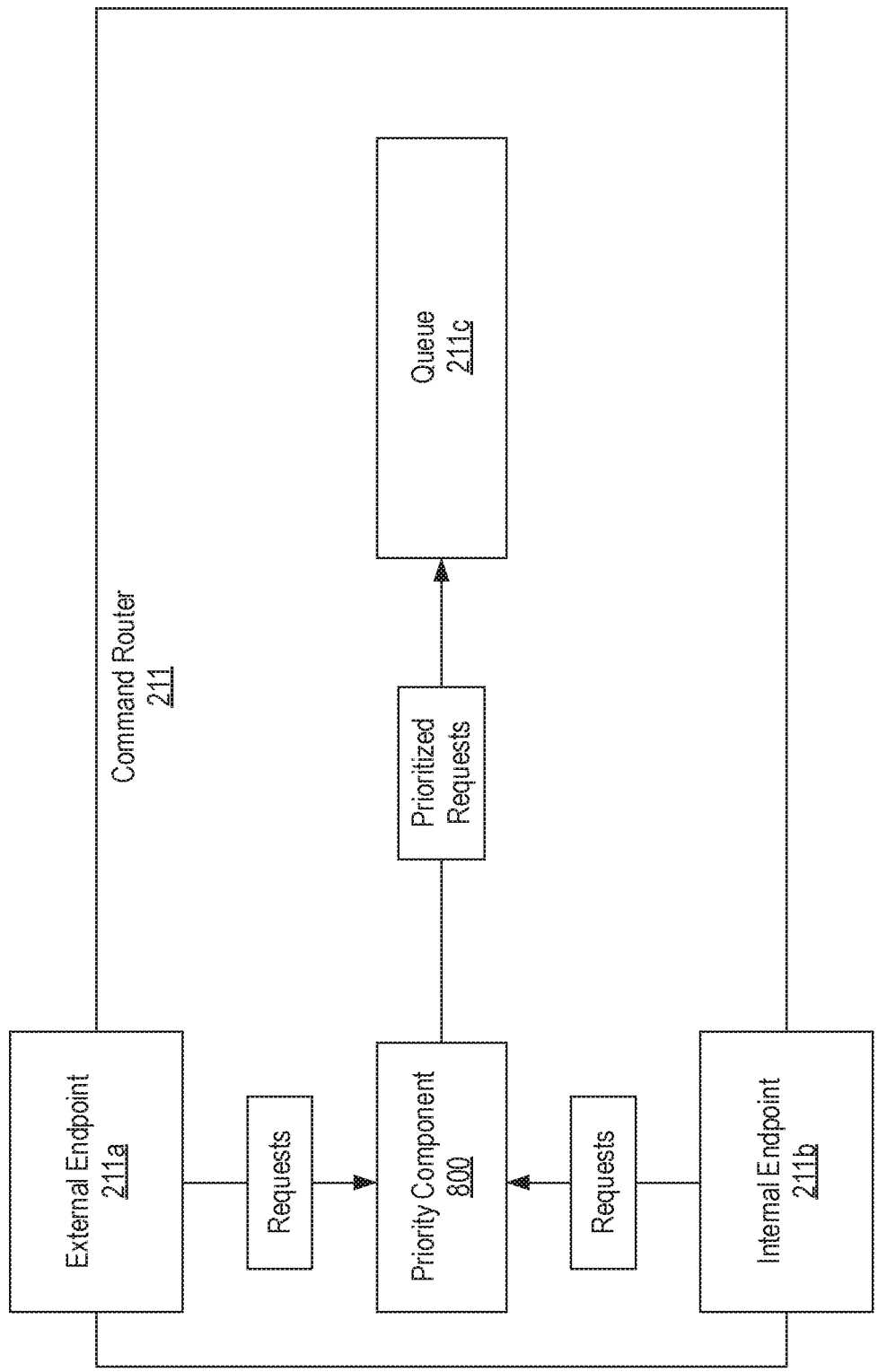
FIG. 8 provides an example of how the command router can prioritize requests.

FIG. 8 represents how command router 211 can be configured to prioritize requests. As shown, command router 211 may include a priority component 800 that is configured to evaluate requests that are received via external endpoint 211a and/or internal endpoint 211b. Based on this evaluation, priority component 800 can add the requests to queue 211c in an order that matches their priority. For example, priority component 800 may prioritize requests that target plugin 220-1 over requests that target plugin 220-2. In such cases, priority component 800 can ensure that any request that targets plugin 220-1 is stored in queue 211c before any request that targets plugin 220-2. Because command router 211 handles all requests that target plugins 220, it can perform this type of prioritization of requests that target different plugins 220.

Figure 9:
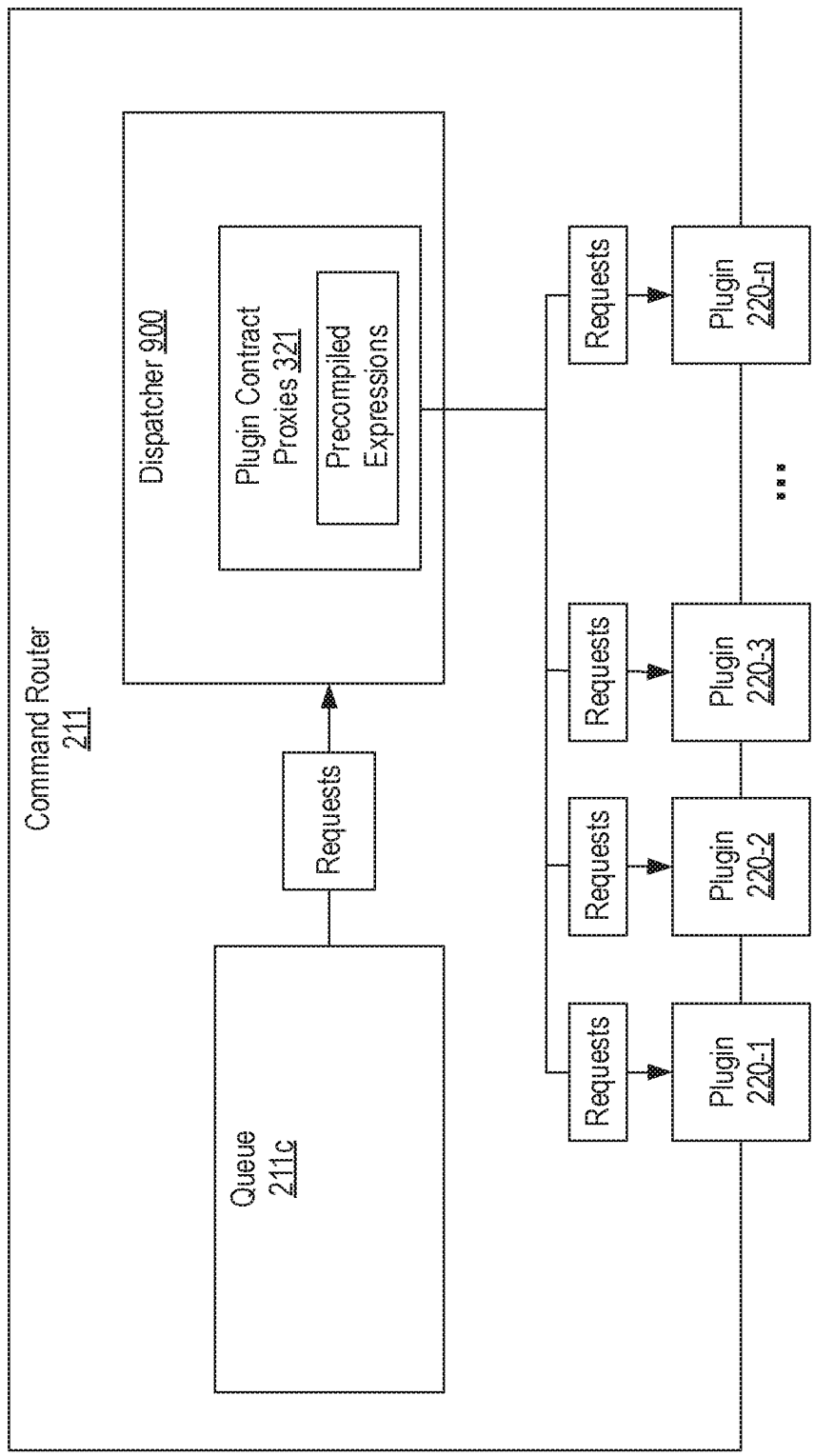
FIG. 9 provides an example of how the command router can dispatch requests to the plugins.

FIG. 9 represents how command router 211 can dispatch requests stored in queue 211c to the appropriate plugin 220. As shown, command router 211 can include a dispatcher 900 that is configured to instantiate plugin contract proxies 321 and invoke their methods to route the requests to the appropriate plugin 220. As mentioned above, dispatcher 900 can leverage precompiled expressions to increase the performance of routing requests to plugins 220.

In summary, command router 211 provides a common mechanism by which all requests that target plugins 220 can be handled regardless of whether the requests originate from an external client 230 or another plugin 220. Command router 211 can therefore provide a variety of functionality for routing and managing requests that target different plugins. In this way, it can be much easier to add a plugin to or remove a plugin from core service 210.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for routing requests comprising:
   executing an optimizer application on a computing device that runs an operating system, the optimizer application including a core service, a plurality of plugins that run in the core service and a plurality of clients that are each external to the core service and configured to interface with at least one of the plurality of plugins, the plurality of clients including a graphical user interface (GUI), the common language infrastructure (CLI), and a Windows Management Instrumentation (WMI) provider, the core service including a command router having an external endpoint, an internal endpoint, and a queue, the external endpoint enabling the plurality of clients that are external to the core service but internal to the application to submit requests to the plurality of plugins that run in the core service, each plugin implementing a plugin contract by which functionality of the plugin may be invoked;
   receiving, by the command router and via the external endpoint, a first request from the GUI, the CLI, or the WMI provider;
   determining, by the command router, that the first request targets a first plugin of the plurality of plugins by determining that the first request specifies a contract that the first plugin implements; and
   in response to determining that the first request targets the first plugin, invoking, by the command router, a contract proxy implemented by the first plugin using one or more parameters specified in the first request.

2. The method of claim 1, wherein the external endpoint is a Windows Communication Foundation (WCF) endpoint.

3. The method of claim 2, wherein the contract that the first plugin implements is a WCF contract.

4. The method of claim 1, further comprising:
   receiving, by the command router and via the external endpoint, a second request from different one of the GUI, the CLI, or the WMI provider;
   determining, by the command router, that the second request targets the first plugin by determining that the second request specifies the contract that the first plugin implements; and
   in response to determining that the second request targets the first plugin, invoking, by the command router, the method implemented by the first plugin.

5. The method of claim 4, wherein invoking the method implemented by the first plugin in response to determining that the second request targets the first plugin comprises invoking precompiled expressions pertaining to the method.

6. The method of claim 1, further comprising:
   receiving, by the command router and via the internal endpoint, a second request from a second plugin of the plurality of plugins;
   in response to receiving the second request, invoking, by the command router, the method implemented by the first plugin.

7. The method of claim 6, wherein the second request provides one or more parameters for invoking the method.

8. The method of claim 1, further comprising:
storing in the queue the requests received from the GUI, the CLI, and the WMI provider via the external endpoint and the requests received from the at least some of the plurality of plugins via the internal endpoint.

9. The method of claim 1, further comprising:
performing a security evaluation on the requests received from the GUI, the CLI, and the WMI provider via the external interface; and
for each of at least one of the requests received from the GUI, the CLI, and the WMI provider via the external interface, foregoing invoking a method implemented by a plugin that the request targets based on the security evaluation of the request.

10. The method of claim 1, further comprising:
synchronizing requests that are received via one or both of the external endpoint or the internal endpoint.

11. The method of claim 1, further comprising:
throttling requests that are received via one or both of the external endpoint or the internal endpoint.

12. One or more computer storage media storing computer executable instructions which when executed perform a method for routing requests, the method comprising:
executing an optimizer application on a computing device that runs an operating system, the optimizer application including a core service, a plurality of plugins that run in the core service and a plurality of clients that are each external to the core service and configured to interface with at least one of the plurality of plugins, the plurality of clients including a graphical user interface (GUI), the common language infrastructure (CLI), and a Windows Management Instrumentation (WMI) provider, the core service including a command router having an external endpoint, an internal endpoint, and a queue, the external endpoint enabling the plurality of clients that are external to the core service but internal to the application to submit requests to the plurality of plugins that run in the core service, each plugin implementing a plugin contract by which functionality of the plugin may be invoked;
receiving, by the command router and via the external endpoint, a first request from the GUI, the CLI, or the WMI provider;
determining, by the command router, that the first request targets a first plugin of the plurality of plugins by determining that the first request specifies a contract that the first plugin implements; and
in response to determining that the first request targets the first plugin, invoking, by the command router, a contract proxy implemented by the first plugin using one or more parameters specified in the first request.

13. The computer storage media of claim 12, wherein the external endpoint is a Windows Communication Foundation (WCF) endpoint.

14. The computer storage media of claim 13, wherein the contract that the first plugin implements is a WCF contract.

15. The computer storage media of claim 12, wherein the method further comprises:
routing requests received via the external endpoint and requests received via the internal endpoint to the plurality of plugins by performing one or more of:
performing a security evaluation on the requests;
synchronizing the requests;
throttling the requests; or
prioritizing the requests.

16. A computing device comprising:
one or more processors; and
computer storage media storing computer executable instructions which when executed by the one or more processors implement a method for routing requests, the method comprising:
executing an optimizer application on the computing device which also runs an operating system, the optimizer application including a core service, a plurality of plugins that run in the core service and a plurality of clients that are each external to the core service and configured to interface with at least one of the plurality of plugins, the plurality of clients including a graphical user interface (GUI), the common language infrastructure (CLI), and a Windows Management Instrumentation (WMI) provider, the core service including a command router having an external endpoint, an internal endpoint, and a queue, the external endpoint enabling the plurality of clients that are external to the core service but internal to the application to submit requests to the plurality of plugins that run in the core service, each plugin implementing a plugin contract by which functionality of the plugin may be invoked;
receiving, by the command router and via the external endpoint, a first request from the GUI, the CLI, or the WMI provider;
determining, by the command router, that the first request targets a first plugin of the plurality of plugins by determining that the first request specifies a contract that the first plugin implements; and
in response to determining that the first request targets the first plugin, invoking, by the command router, a contract proxy implemented by the first plugin using one or more parameters specified in the first request.

17. The computing device of claim 16, wherein the external endpoint is a Windows Communication Foundation (WCF) endpoint.

18. The computing device of claim 17, wherein the contract that the first plugin implements is a WCF contract.

19. The method of claim 16, wherein the plurality of plugins include:
an audio plugin;
a proximity sensor plugin;
an application performance plugin;
a battery extender plugin; and
a BIOS attribute plugin.

20. The method of claim 19, wherein the plurality of plugins also include:
a dynamic charge plugin;
a battery plugin;
a power management plugin;
a telemetry plugin;
a setting plugin;
a Toast notification plugin;
a discrete graphics plugin; and
a memory performance plugin.

* * * * *